United States Patent
Jiang et al.

(10) Patent No.: US 9,451,629 B2
(45) Date of Patent: Sep. 20, 2016

(54) RESOURCE ALLOCATION FOR THE COEXISTENCE OF PEER DISCOVERY AND LEGACY LTE TRAFFIC

(71) Applicant: QUALCOMM Incorporated, San Diego, CA (US)

(72) Inventors: Libin Jiang, Bridgewater, NJ (US); Shailesh Patil, Bridgewater, NJ (US); Saurabha Rangrao Tavildar, Jersey City, NJ (US); Nilesh Nilkanth Khude, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 13/777,779

(22) Filed: Feb. 26, 2013

(65) Prior Publication Data
US 2014/0241256 A1    Aug. 28, 2014

(51) Int. Cl.
   *H04W 72/12*   (2009.01)
   *H04L 1/18*    (2006.01)
   *H04W 8/00*    (2009.01)

(52) U.S. Cl.
   CPC ........ *H04W 72/1215* (2013.01); *H04L 1/1812* (2013.01); *H04W 8/005* (2013.01)

(58) Field of Classification Search
   CPC . H04W 8/005; H04W 76/023; H04W 16/14; H04W 48/16; H04W 92/18; H04L 1/1812
   See application file for complete search history.

(56) References Cited

U.S. PATENT DOCUMENTS

| | | |
|---|---|---|
| 2008/0151845 A1 | 6/2008 | Jaakkola et al. |
| 2009/0010232 A1 | 1/2009 | Laroia et al. |
| 2009/0016249 A1 | 1/2009 | Li et al. |
| 2010/0165882 A1 | 7/2010 | Palanki et al. |
| 2011/0255450 A1 | 10/2011 | Wang et al. |
| 2011/0268101 A1* | 11/2011 | Wang .................... H04L 5/0053 370/344 |
| 2012/0182890 A1 | 7/2012 | Li et al. |

FOREIGN PATENT DOCUMENTS

WO    2011132721 A1    10/2011

OTHER PUBLICATIONS

International Search Report and Written Opinion—PCT/US2014/016972—ISA/EPO—Jun. 2, 2014.

* cited by examiner

*Primary Examiner* — Ian N Moore
*Assistant Examiner* — Brian T Le
(74) *Attorney, Agent, or Firm* — Arent Fox LLP

(57) ABSTRACT

A method, an apparatus, and a computer program product for wireless communication are provided. The apparatus allocates K blocks of subframes for WAN and peer-to-peer communications in a discovery period T and remaining subframes in the discovery period T for WAN communications and allocates a first set of subframes for peer discovery and a second set of subframes for the WAN communications in each block of the K blocks.

52 Claims, 13 Drawing Sheets

RESOURCE ALLOCATION FOR THE COEXISTENCE OF PEER DISCOVERY AND LEGACY LTE TRAFFIC

BACKGROUND

1. Field

The present disclosure relates generally to communication systems, and more particularly, to resource allocation for the coexistence of peer discovery and legacy Long Term Evolution (LTE) traffic.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus allocates K blocks of subframes for WAN and peer-to-peer communications in a discovery period T and remaining subframes in the discovery period T for WAN communications and allocates a first set of subframes for peer discovery and a second set of subframes for the WAN communications in each block of the K blocks.

DETAILED DESCRIPTION

Figure 1:
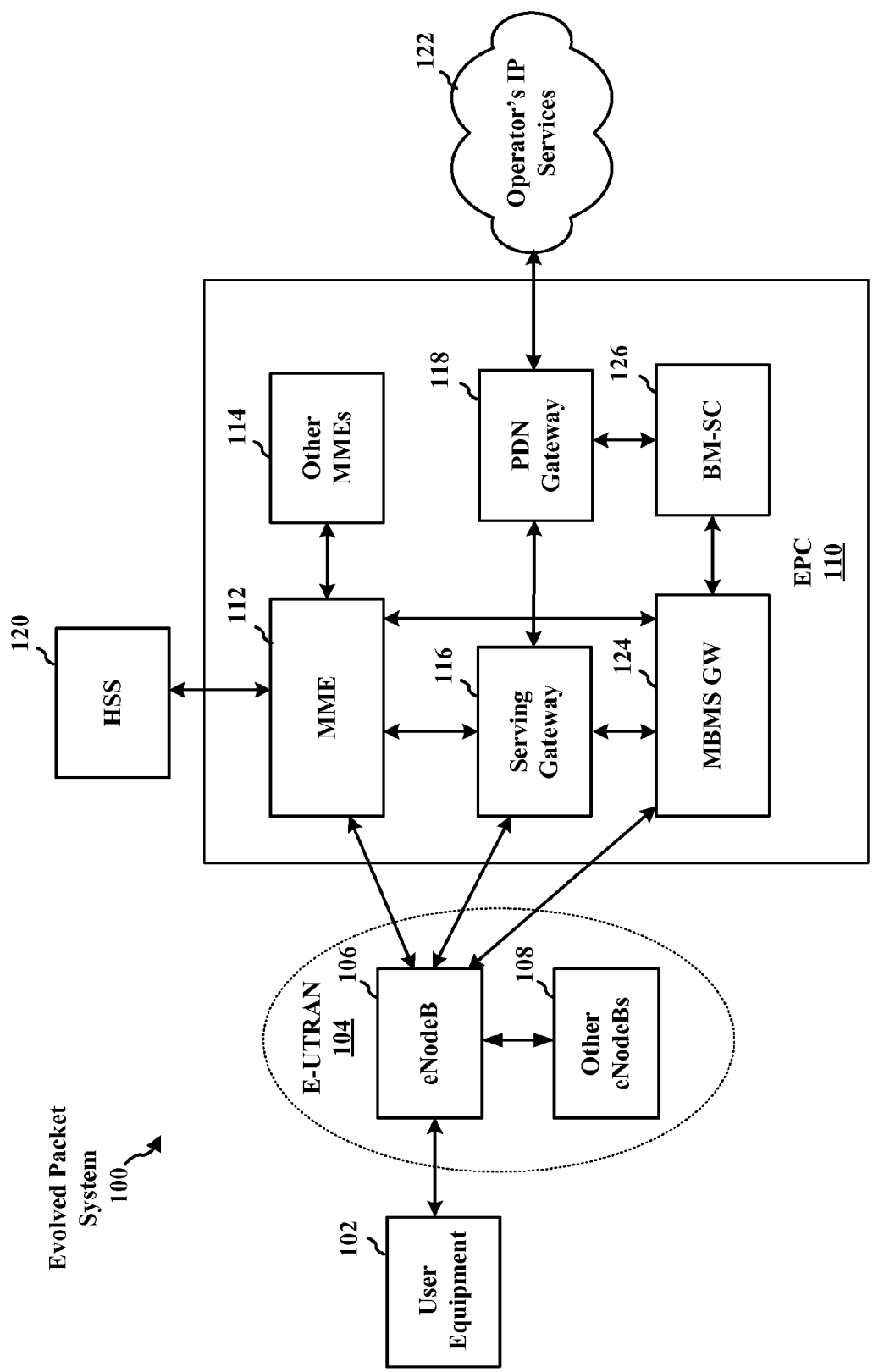
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
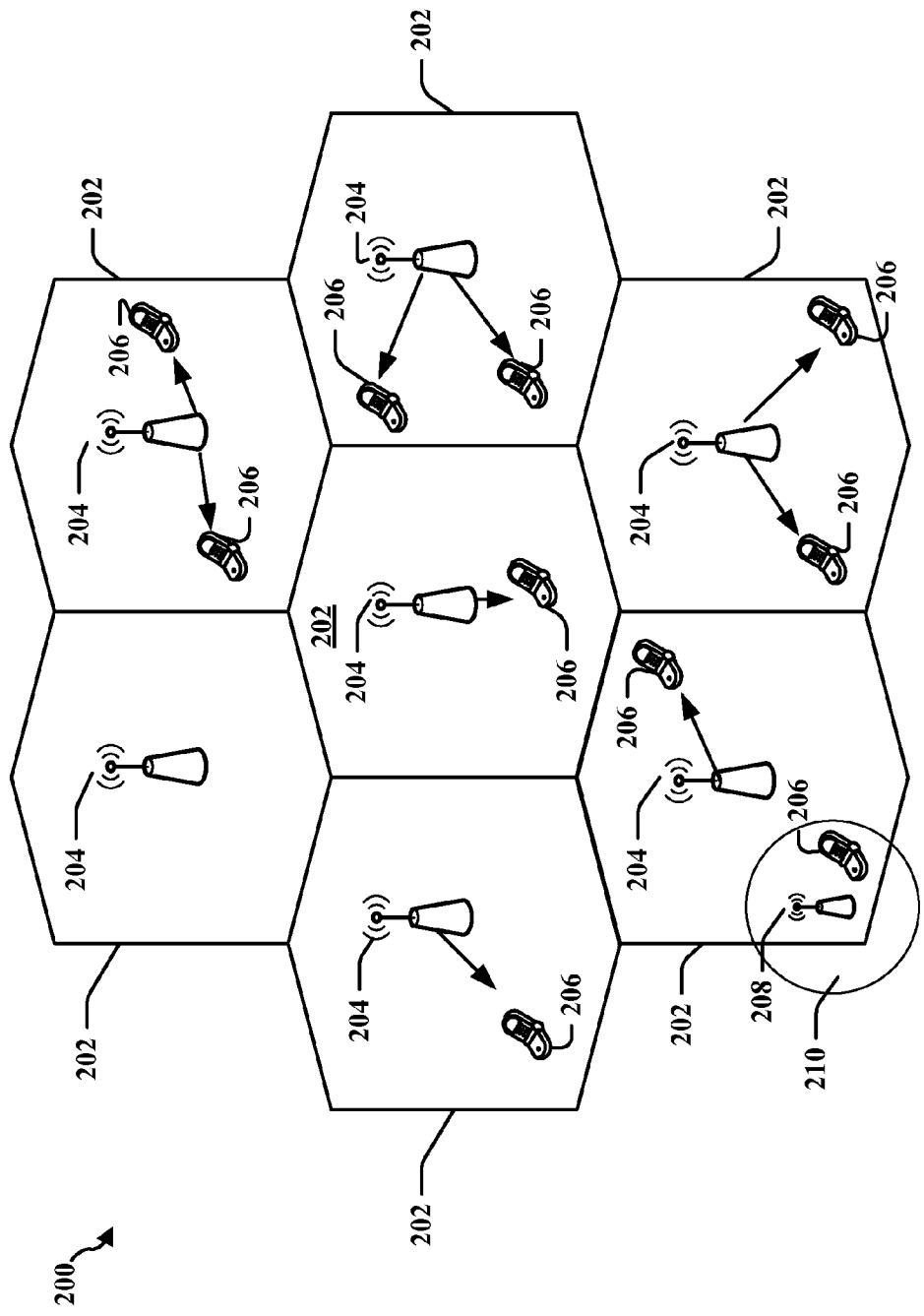
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
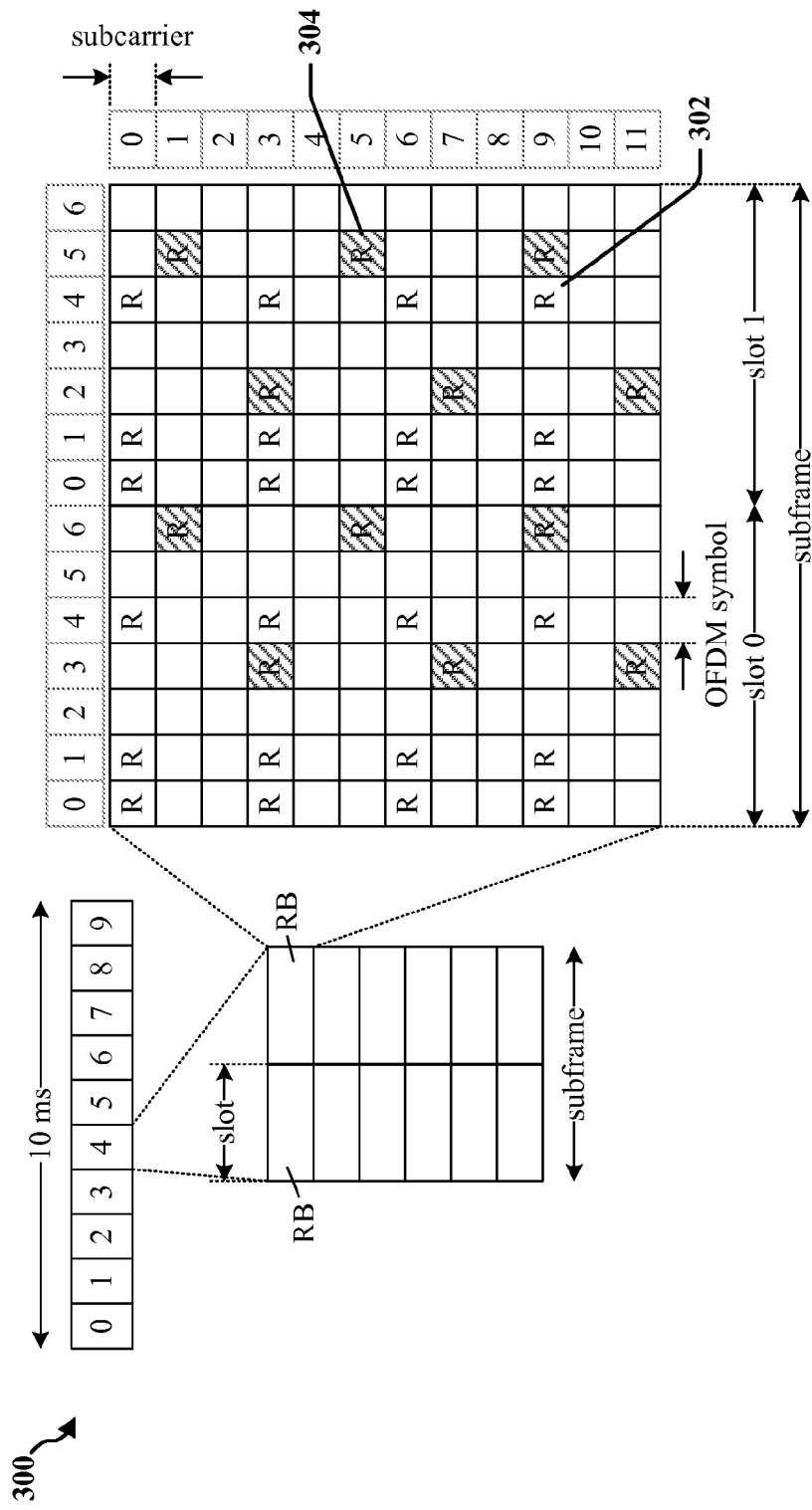
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
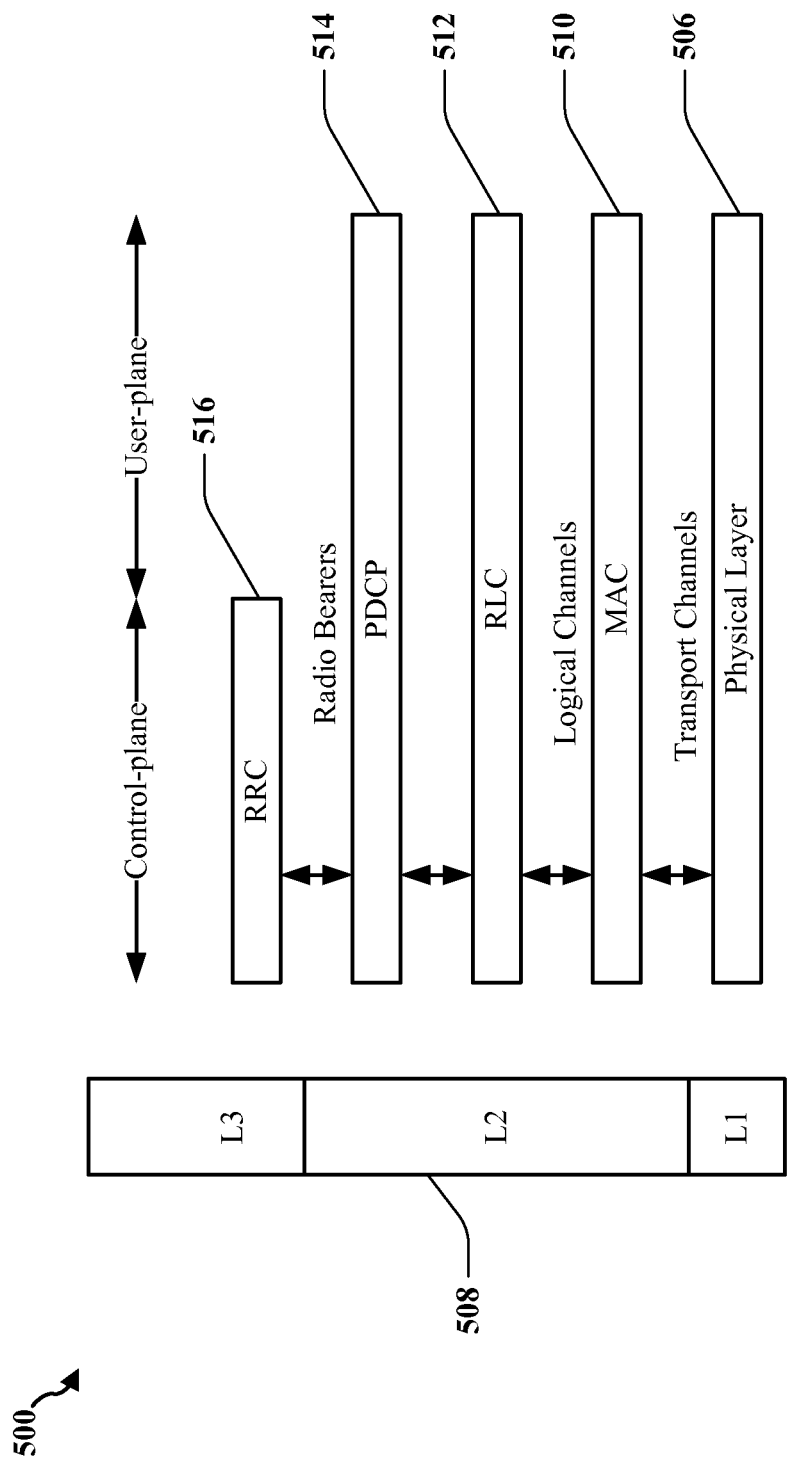
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC)

sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
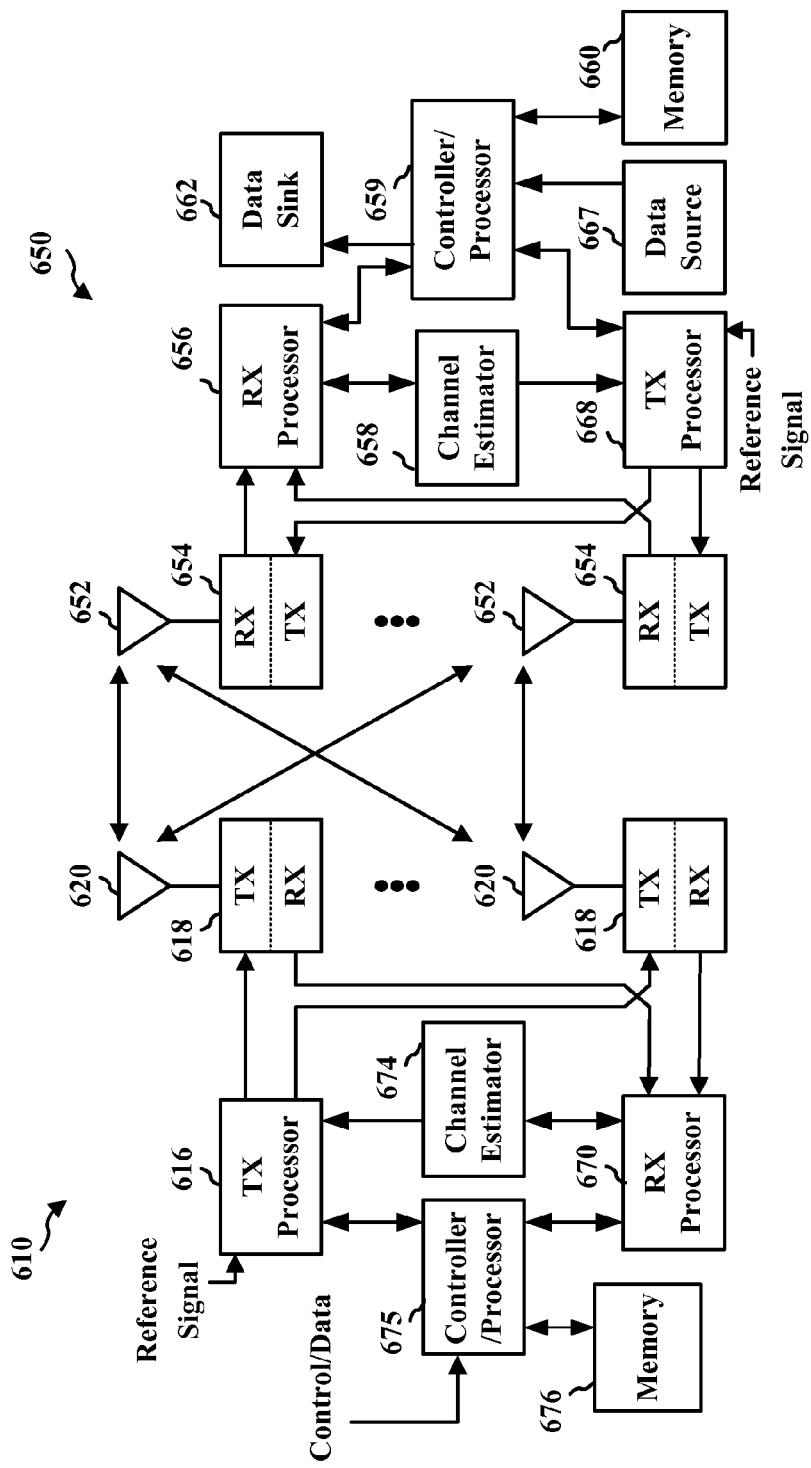
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
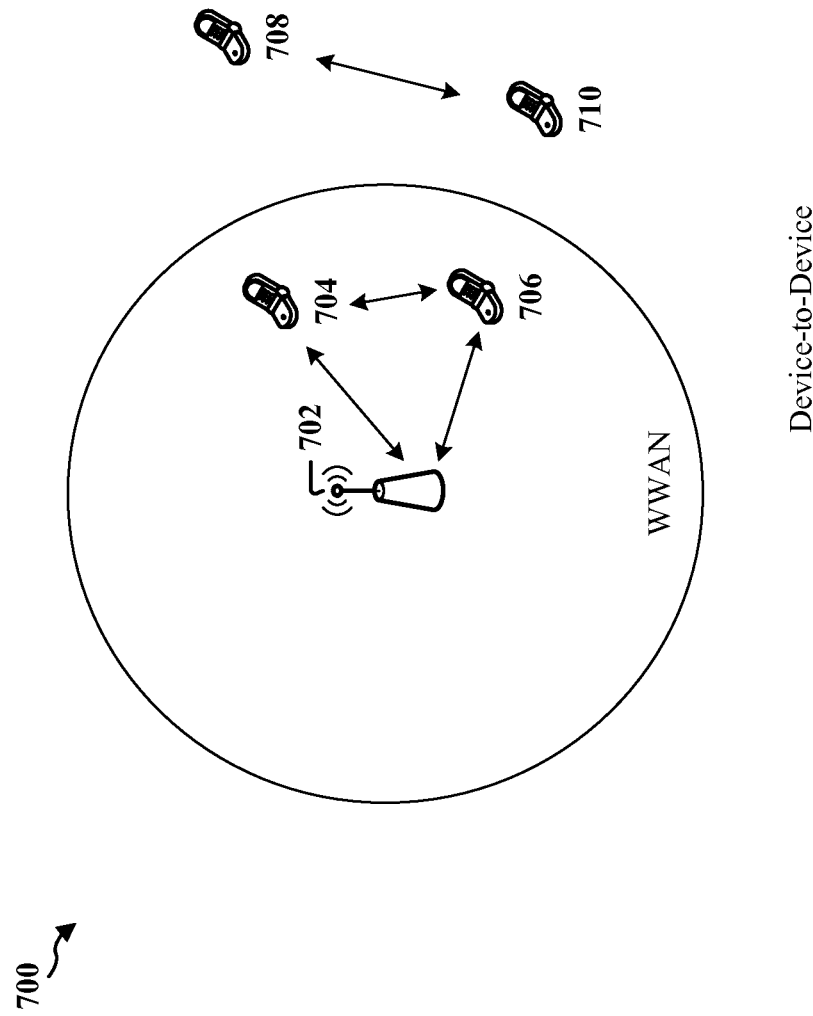
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices

704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

When allocating wireless communication resources for peer discovery (PD) in a wide area network (WAN), several factors may be considered. For example, the wireless communication resources may be one or more subframes and the WAN may be an LTE network. In an aspect, and as discussed infra, the several factors may include the power consumed by a UE when powering on and off (e.g., waking up from a sleep mode and subsequently going back to the sleep mode), the number of subframes to be used for peer discovery, and disruption of traffic in the WAN.

Generally, both the wake-up and sleep processes of a UE consume time and power. As such, UEs may consume a significant amount of time and power when waking up from the sleep mode to perform peer discovery and subsequently going back to the sleep mode. Therefore, in order to reduce such time and power consumption, all UEs interested in peer discovery should be configured to wake up and be in the on state at the same time to allow for peer discovery. Such a configuration may reduce unnecessary wake-up and sleep processes in the UEs. In one aspect, UEs may be configured to wake up at the same time by using groups of contiguous peer discovery frames.

UEs should perform peer discovery periodically due to the dynamics of the network. The peer discovery period, denoted by T, determines the discovery delay. In LTE-Direct, peer discovery may be performed every 10.0 seconds (s) or 20.0 s. On the other hand, the number of subframes required for peer discovery in each peer discovery period T, denoted by M, may be determined by the density of the UEs of an area.

Due to the previously discussed factors, peer discovery resources should be allocated periodically in groups (also referred to as "clusters" or "blocks"). For example, the peer discovery resources may be allocated using one or more peer discovery blocks of subframes. In each peer discovery block, corresponding traffic in the legacy WAN (e.g., legacy LTE) should not be active in order to avoid mutual interference between WAN traffic and peer discovery. Therefore, each peer discovery block should not be too large since that would significantly disturb the WAN traffic. As such, each peer discovery block may be configured to include no more than a maximum of D subframes.

Without loss of generality, the aspects described herein are based on a configuration where peer discovery is performed using the UL spectrum in an LTE system employing FDD (Frequency Division Duplex). However, it should be understood that the aspects described herein are not limited to such a configuration.

Figure 8:
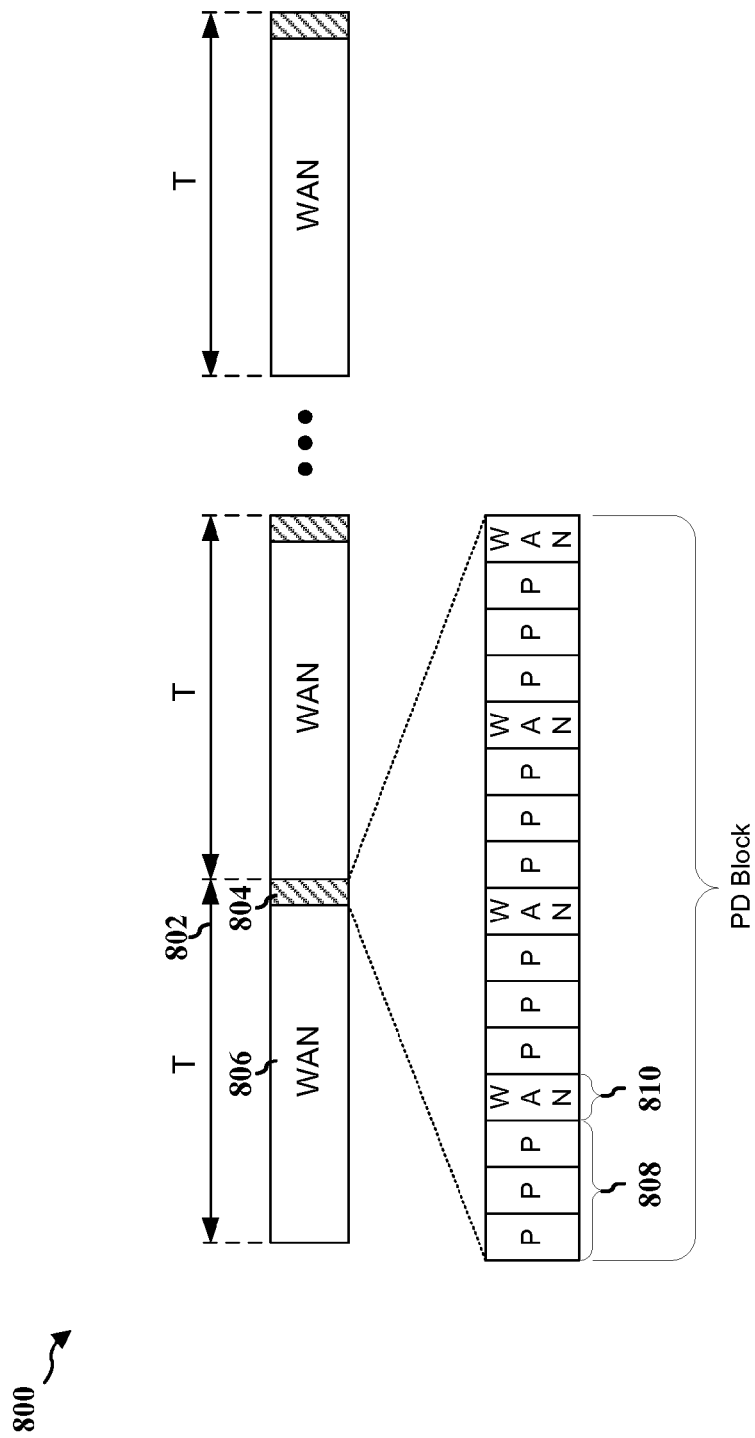
FIG. 8 is a diagram illustrating peer discovery and wide area network (WAN) resource allocations.

FIG. 8 is a diagram 800 illustrating peer discovery and WAN resource allocations. In the configuration of FIG. 8, a K number of peer discovery blocks may be assigned in each discovery period T For example, T may be a period of time in seconds, and K may be an integer. In FIG. 8, one peer discovery block (i.e., K=1), such as peer discovery block 804 indicated by the shaded region, may be assigned at the end of each peer discovery period T, such as the peer discovery period T 802. In one aspect, the K peer discovery blocks may be distributed evenly such that the same number of peer discovery blocks are assigned in each discovery period T.

Each peer discovery block in FIG. 8 may contain a maximum of D subframes. In one aspect, $D=(k+m) \times L$, where k represents a consecutive number of subframes for peer discovery, m represents a consecutive number of subframes for WAN communications immediately following the k subframes, and L represents the number of times that the sequence of k and m subframes is repeated in the peer discovery block. For example, the resource allocation in FIG. 8 is configured such that T=20 s, K=1, k=3, m=1, and L=4. In this configuration, with reference to FIG. 8, the peer discovery block 804 includes a sequence of three consecutive subframes 808 for peer discovery followed by one subframe 810 for WAN communications, where such sequence of subframes is repeated four times. The number of subframes allocated for the WAN communications in each peer discovery block may be represented by the expression $m \times L$. Note that (k+m) is the period of WAN subframes in the peer discovery block.

The power consumed by a UE for wake-up and sleep processes may be represented by the expression $K \times E_{ON-OFF}/T$, where $E_{ON-OFF}$ is the total energy required for each wake-up and sleep process.

In one aspect, the values of K, L, k, and m, may be selected to satisfy the following two conditions:

$$D \geq (k+m) \times L \text{ and}$$

$$M \leq (K \times k \times L)$$

Moreover, the values of K, L, k, and m may be further selected for the purpose of reducing disruption to WAN traffic. In an aspect, the value of K may be determined based on the power consumed due to powering UEs on and off (e.g., the UEs waking up and entering the sleep mode), a proportion of delay sensitive traffic, HARQ transmissions, and/or a density of UEs of an area. For example, the density of UEs of an area may be determined by the number of UEs located within an area of a cell.

The outage probability of WAN traffic is related to the fraction of peer discovery resources, which may be represented by the ratio $(K \times k \times L)/T$. If K, k and L have already been selected, then T may be selected to manage a tradeoff between the discovery delay and the outage probability of the WAN traffic.

In an aspect, the WAN subframes in the peer discovery blocks may be used for uplink communications transmitted by a UE and received by a base station (e.g., an eNB). Accordingly, the WAN subframes in the peer discovery blocks may be used for uplink communications transmitted by a UE to accommodate real-time traffic having stringent delay requirements and periodic traffic patterns. For example, if the real-time traffic involves uplink voice sessions, such voice sessions are typically scheduled using semi-persistent scheduling (SPS) to reduce the scheduling overhead. Since a voice packet is generated every 20.0 ms (which is a multiple of 4.0 ms) in a voice session, the starting times of voice sessions may be scheduled such that the transmissions of voice packets by a UE always occur in the WAN subframes in the peer discovery block. For example, in a configuration where k=3 and m=1, one WAN subframe will occur every 4 subframes in a peer discovery block as shown in FIG. 8. Therefore, if each subframe is configured to be 1.0 ms, a WAN subframe will occur every 4.0 ms in the peer discovery block. Therefore, the WAN subframes will occur with adequate frequency in the peer discovery block to ensure that a WAN subframe will be available every 20.0 ms. Such a configuration may allow voice packets to be transmitted in the WAN subframes of the peer discovery block without any disruptions. HARQ retransmissions in voice sessions may also correspond with the WAN subframes included in the peer discovery block, since such HARQ retransmissions are typically scheduled every 8.0 ms. Therefore, voice sessions may be uninterrupted with proper starting times.

It should be noted that if WAN subframes are otherwise not available in the peer discovery block, each voice session may need to be suspended at the beginning of the peer discovery block and restarted at the end of the peer discovery block to avoid interfering with the peer discovery block. Such suspension and restarting of voice sessions requires explicit control messages, which may not be feasible if there are a large number of voice sessions.

As previously discussed, the values of K and k+m may be selected to support HARQ retransmissions. For example, by selecting k+m to be a factor of the HARQ interlace 8, a WAN subframe may be made available every 8.0 ms in the peer discovery block to allow uninterrupted HARQ retransmissions. Such a configuration may similarly provide uninterrupted HARQ retransmissions in cases of TCP traffic. For example, if k+m=4, some TCP HARQ processes may not be interrupted. However, other TCP HARQ processes may need to be suspended during the peer discovery block.

The periodic WAN subframes in the peer discovery blocks may also help LTE downlink traffic, since PUCCH (which contains information such as an ACK/NACK for downlink traffic, a channel quality indicator (CQI), etc.) is not interrupted in the WAN subframes. Therefore, LTE downlink performance during peer discovery blocks may be improved. Generally, a higher ratio of m to k may improve downlink performance. However, such a higher ratio of m to k may increase the idle time of a UE during discovery if the UE does not use the WAN subframes.

Figure 9A:
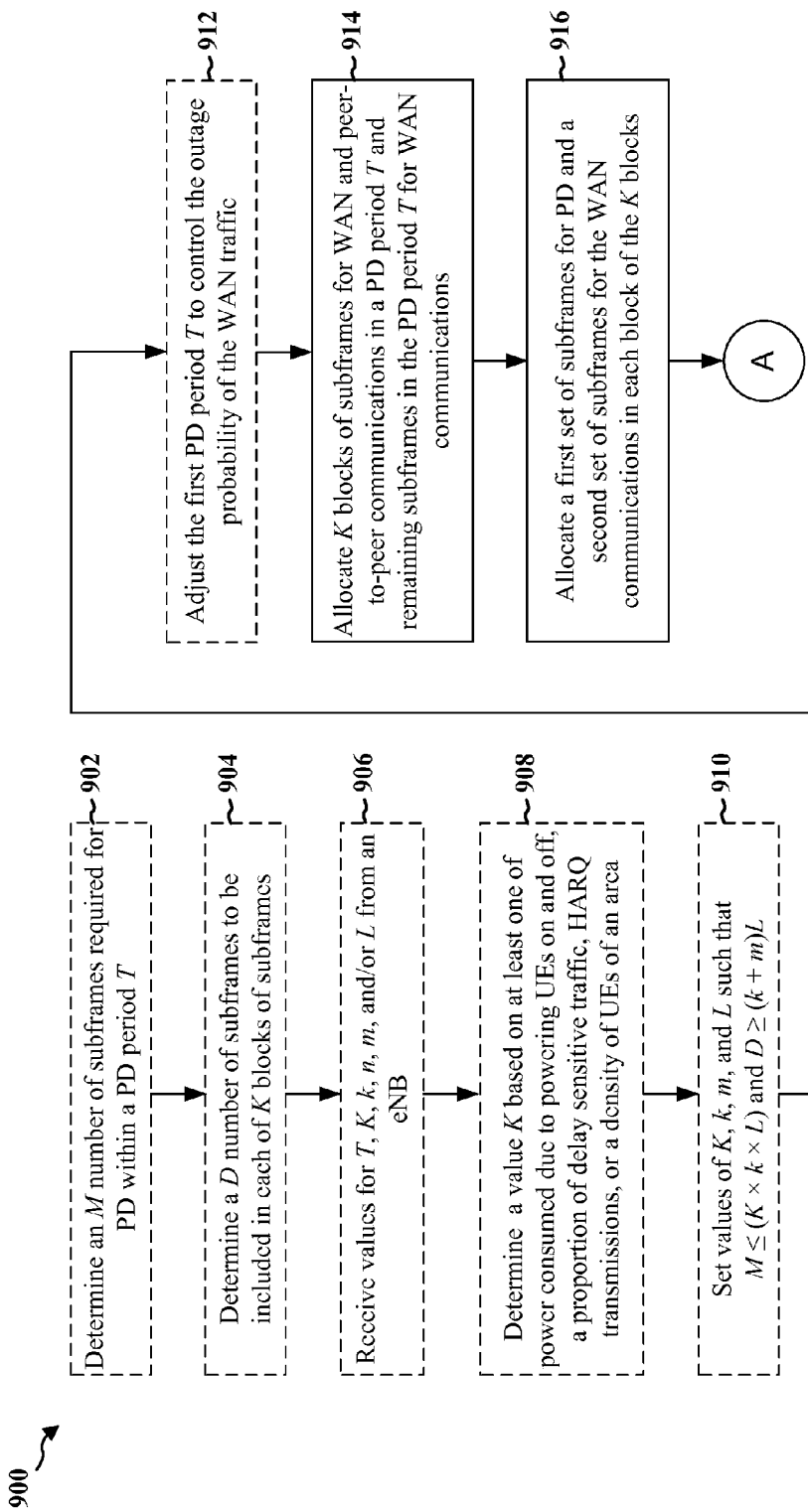
FIGS. 9A and 9B are a flow chart of a method of wireless communication.
Figure 9B:
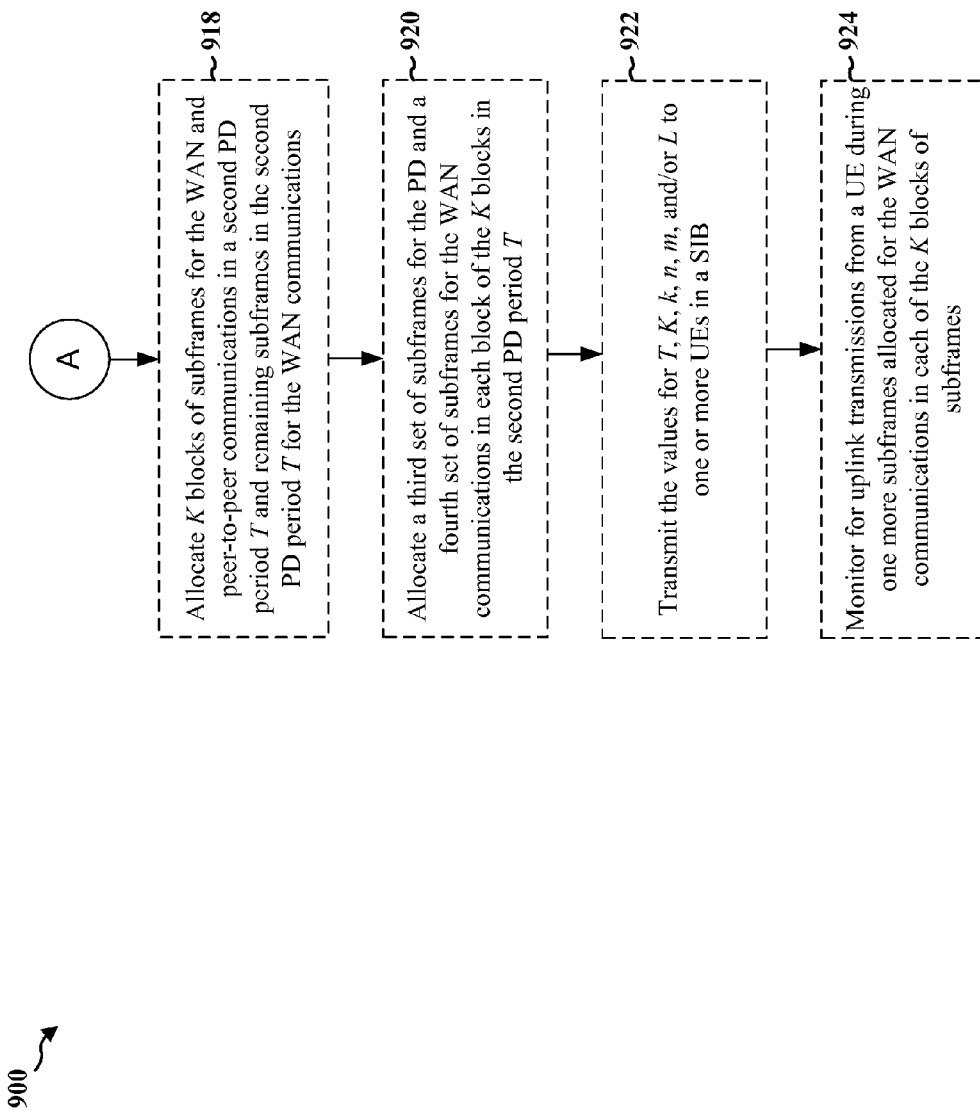

FIGS. 9A and 9B are a flow chart 900 of a method of wireless communication. The method may be performed by an eNB. At step 902, the eNB may determine an M number of subframes required for peer discovery within a peer discovery period T. For example, and with reference to FIG. 8, the peer discovery period T 802 may be 20.0 s and the M number of subframes (e.g., the subframes labeled as "P") required for peer discovery may be 12. In one aspect, the M number of subframes required for peer discovery may be determined based on the density of the UEs of an area. In such aspect, as the number of UEs within an area is increased, the M subframes required for peer discovery may also be increased.

At step 904, the eNB may determine a D number of subframes representing the maximum number of subframes that may be included in each of K blocks of subframes. For example, with reference to FIG. 8, the value of D may be determined to be 16. Therefore, in such a configuration, the peer discovery block 804 may not include more than 16 subframes.

At step 906, the eNB may receive values for T, K, k, n, m, and/or L from another eNB. The first eNB may use one or more of these values for resource allocation in its cell, or choose the values itself as describe below.

At step 908, the eNB may determine the value of K based on the power consumed due to powering UEs on and off, a proportion of delay sensitive traffic, HARQ transmissions, and/or a density of UEs of an area. In one configuration, UEs may be powered on and off as a result of performing wake-up (i.e., powering on) and sleep (i.e., powering off) operations. For example, if power consumption of a UE due to powering on and off is high, K may be determined to be a low value (e.g., K=1). In one configuration, it may be preferable to configure a low number of peer discovery blocks having extended lengths in a discovery period T than to configure a large number of peer discovery blocks. Therefore, a low value for K may decrease the number of times that a UE seeking peer to peer communications is required to wake up during a discovery period T and, therefore, may reduce the power consumed by such a UE. As another example, if the proportion of delay sensitive WAN uplink traffic to all WAN uplink traffic is relatively large, the number of subframes allocated for WAN uplink communications in each peer discovery block may be increased (e.g., increase m, decrease k, or both), and K may be determined to be a large value (e.g., K=10). As another example, if the density of UEs seeking peer to peer communications increases, the values of K, k, or L may be increased or the value of m may be decreased.

At step 910, the eNB may set values of K, k, m, and L such that M≤(K×k×L) and D≥(k+m)×L. Also, given that (k+m) is the period of WAN subframes in the peer discovery block, (k+m) may be chosen as a factor of the period of real-time packets (e.g., 20.0 ms for voice packets) and/or the period of HARQ retransmissions (e.g., 8.0 ms) in order to reduce the interruption to real-time traffic and/or HARQ retransmissions.

At step 912, the eNB may adjust the first peer discovery period T to control the outage probability of the WAN traffic. The outage probability of WAN traffic is related to the fraction of peer discovery resources, which may be represented by the ratio (K×k×L)/T. Therefore, if K, k and L have already been selected, T may be adjusted to manage a tradeoff between the discovery delay and the outage probability of the WAN traffic. For example, if the value of T is increased, the outage probability of the WAN traffic may be reduced and the discovery delay may be increased. Alternatively, if the value of T is decreased, the outage probability of the WAN traffic may be increased and the discovery delay may be decreased.

At step 914, the eNB may allocate K blocks of subframes for WAN and peer-to-peer communications in a peer discovery period T and remaining subframes in the peer discovery period T for WAN communications. For example, with reference to FIG. 8, the eNB may allocate the peer discovery block 804 for WAN and peer-to-peer communications in the peer discovery period T 802 and allocate remaining subframes 806 in the peer discovery period T for WAN communications.

At step 916, the eNB may allocate a first set of subframes for peer discovery and a second set of subframes for the WAN communications in each block of the K blocks. In an aspect, the eNB may allocate m×L subframes for the WAN communications in each of the K blocks such that each of at least one set of k contiguous subframes for peer discovery is followed by m subframes for the WAN communications. For example, as shown in the configuration of FIG. 8, k may be set to three, m may be set to one, and L may be set to four. Accordingly, the peer discovery block 804 includes four subframes for WAN communications (i.e., m×L=1×4=4 subframes for WAN communications), where each of the subframes for WAN communications (e.g., subframe 810 for WAN communications) follows three contiguous subframes for peer discovery (e.g., subframes 808 for peer discovery). In another aspect, the m×L subframes allocated for the WAN communications in each of the K blocks of subframes support at least one of voice services, HARQ transmissions, or control information transmissions.

At step 918, the eNB may allocate K blocks of subframes for the WAN and peer-to-peer communications in a second peer discovery period T and remaining subframes in the second peer discovery period T for the WAN communications. In an aspect, m×L subframes may be allocated for the WAN communications in each of the K blocks in the second discovery period T such that each of at least one set of n contiguous subframes for peer discovery is followed by m subframes for the WAN communications. In one configuration, n may be equal to k. In another configuration, n may not be equal to k. More generally, other parameters (e.g., K, m, L, T) may also be different from those in the first discovery period T.

At step 920, the eNB may allocate a third set of subframes for the peer discovery and a fourth set of subframes for the WAN communications in each block of the K blocks in the second peer discovery period T.

At step 922, the eNB may transmit the values for T, K, k, n, m, and/or L to one or more UEs in an SIB.

At step 924, the eNB may monitor for uplink transmissions from a UE during one or more subframes allocated for the WAN communications in each of the K blocks of subframes. In an aspect, the eNB may disregard one or more uplink transmissions received from the UE during one or more subframes allocated for peer discovery in each of the K blocks of subframes.

Figure 10:
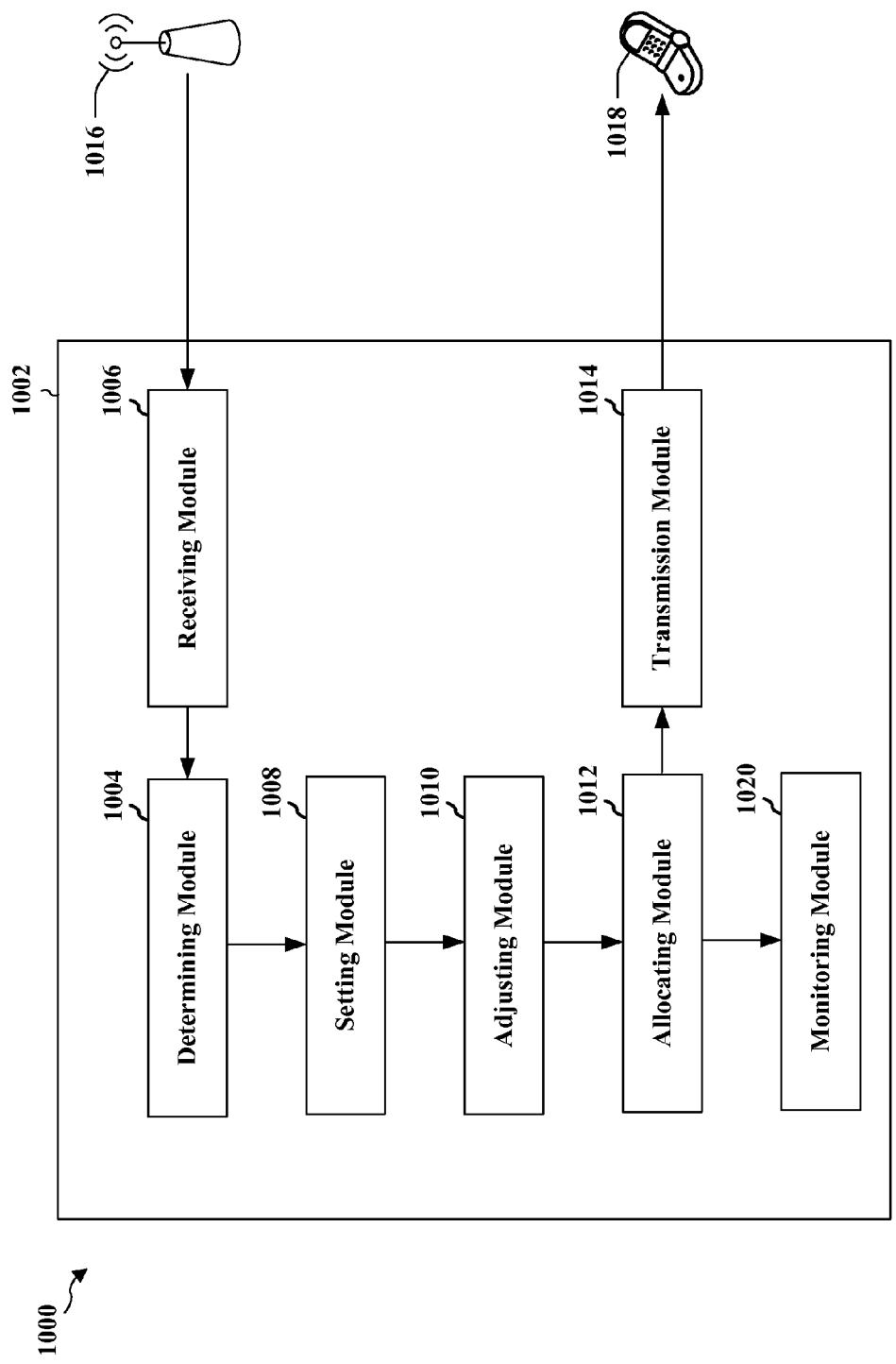
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be an eNB. The apparatus includes a determining module 1004 that determines an M number of subframes required for peer discovery within a peer discovery period T, determines a D number of subframes representing the maximum number of subframes that may be included in each of K blocks of subframes, and determines the value of K based on the power consumed due to powering UEs on and off, a proportion of delay sensitive traffic, HARQ transmissions, and/or a density of UEs of an area.

The apparatus further includes a receiving module 1006 that receives values for T, K, k, n, m, and/or L from another eNB 1016. In an aspect, the values for T, K, k, n, m, and/or L may be received through a backhaul connection or through a wireless communication.

The apparatus further includes a setting module 1008 that sets values of K, k, m, and L such that M≤(K×k×L) and D≥(k+m)×L. In one configuration, (k+m) may be a factor of the period of real-time packets and/or the period of HARQ retransmissions.

The apparatus further includes an adjusting module 1010 that adjusts the first peer discovery period T to control the outage probability of the WAN traffic.

The apparatus further includes an allocating module 1012 that allocates a first set of subframes for peer discovery and a second set of subframes for the WAN communications in each block of the K blocks. In an aspect, the allocating module 1012 allocates m×L subframes for the WAN communications in each of the K blocks such that each of at least one set of k contiguous subframes for peer discovery is followed by m subframes for the WAN communications. In another aspect, the m×L subframes allocated for the WAN communications in each of the K blocks of subframes support at least one of voice services, HARQ transmissions, or control information transmissions. The allocating module 1012 allocates K blocks of subframes for the WAN and peer-to-peer communications in a second peer discovery period T and remaining subframes in the second peer discovery period T for the WAN communications. In an aspect, the allocating module 1012 allocates m×L subframes for the WAN communications in each of the K blocks in the second discovery period T such that each of at least one set of n contiguous subframes for peer discovery is followed by m subframes for the WAN communications. In one configuration, n may be equal to k. In another configuration, n is not equal to k. More generally, other parameters (such as K, m, L, T) may also be different from those in the first discovery period T. The allocating module 1012 allocates a third set of subframes for the peer discovery and a fourth set of subframes for the WAN communications in each block of the K blocks in the second peer discovery period T.

The apparatus further includes a transmission module 1014 that communicates the allocation of resources for WAN communications and peer discovery to one or more UEs 1018. In an aspect, the transmission module 1014 may transmit values for T, K, k, n, m, and/or L in a System Information Block (SIB) to one or more UEs.

The apparatus further includes a monitoring module 1016 that monitors for uplink transmissions from a UE during one or more subframes allocated for the WAN communications in each of the K blocks of subframes.

The apparatus may include additional modules that perform each of the steps of the algorithm in the aforementioned flow chart of FIGS. 9A and 9B. As such, each step in the aforementioned flow chart of FIGS. 9A and 9B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
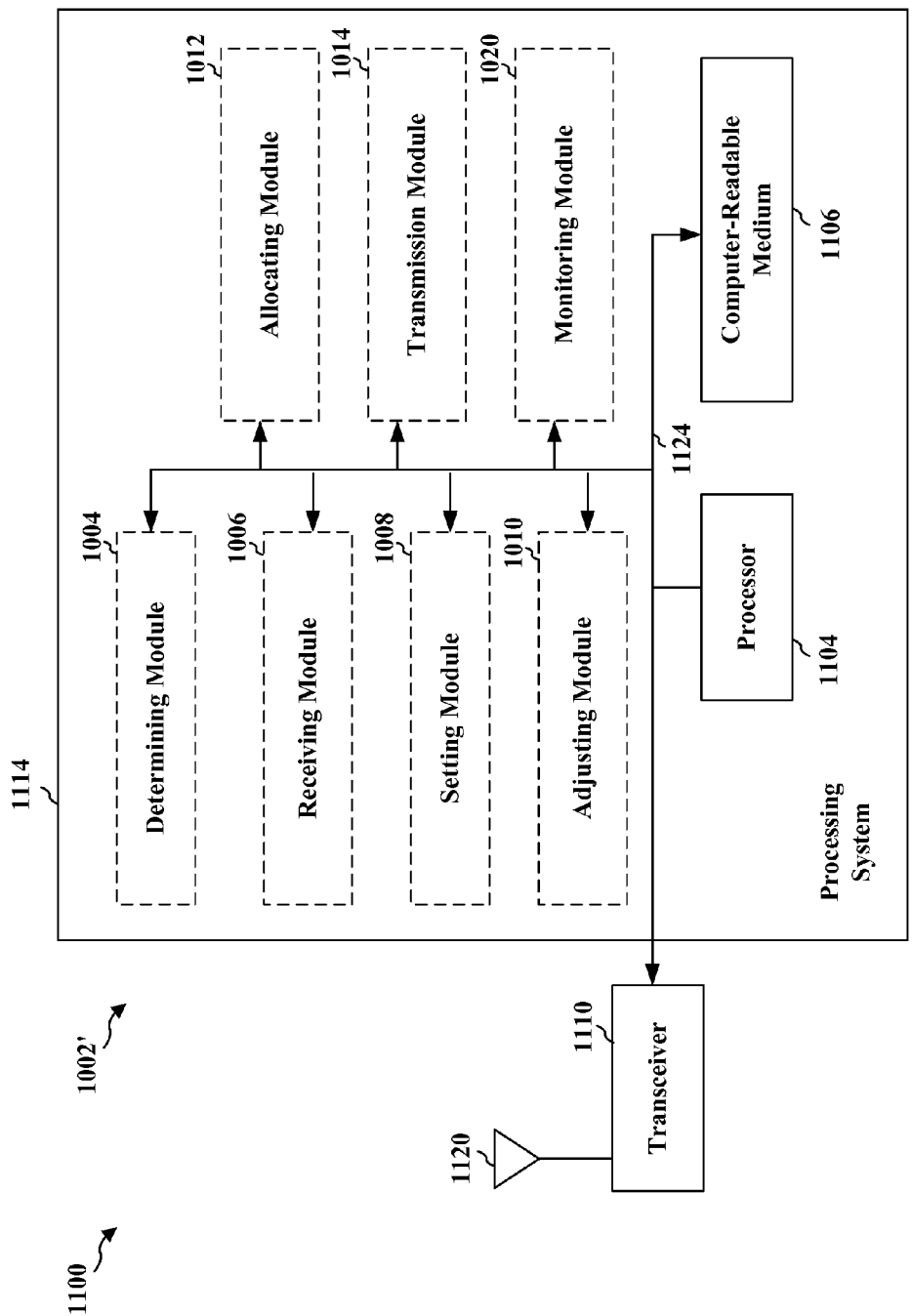
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, and 1014, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1006. In addition, the transceiver 1110 receives information from the processing system 1114, specifically the transmission module 1014, and based on the received information, generates a signal to be applied to the one or more antennas 1120. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, and 1014. The modules may be software modules running in the processor 1104, resident/stored in the computer readable medium 1106, one or more hardware modules coupled to the processor 1104, or some combination thereof. The processing system 1114 may be a component of the eNB 610 and may include the memory 676 and/or at least one of the TX processor 616, the RX processor 670, and the controller/processor 675.

In one configuration, the apparatus 1002/1002' for wireless communication includes means for determining a value K based on power consumed due to powering UEs on and off, a proportion of delay sensitive traffic, HARQ transmissions, and/or a density of UEs of an area, means for allocating K blocks of subframes for WAN and peer-to-peer communications in a discovery period T and remaining subframes in the discovery period T for WAN communications, means for allocating a first set of subframes for peer discovery and a second set of subframes for the WAN communications in each block of the K blocks, means for determining an M number of subframes required for peer discovery within the discovery period T, means for determining a D number of subframes to be included in each of the K blocks of subframes, means for setting values of K, k, m, and L such that M≤(K×k×L) and D≥(k+m)×L, means for adjusting the first discovery period T to control the outage probability of the WAN traffic, means for allocating K blocks of subframes for the WAN and peer-to-peer communications in a second discovery period T and remaining subframes in the second discovery period T for the WAN communications, means for allocating a third set of subframes for the peer discovery and a fourth set of subframes for the WAN communications in each block of the K blocks in the second discovery period T, means for receiving values for T, K, k, n, m, and/or L from an eNB, and means for monitoring for uplink transmissions from a UE during one or more subframes allocated for the WAN communications in each of the K blocks of subframes.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 12:
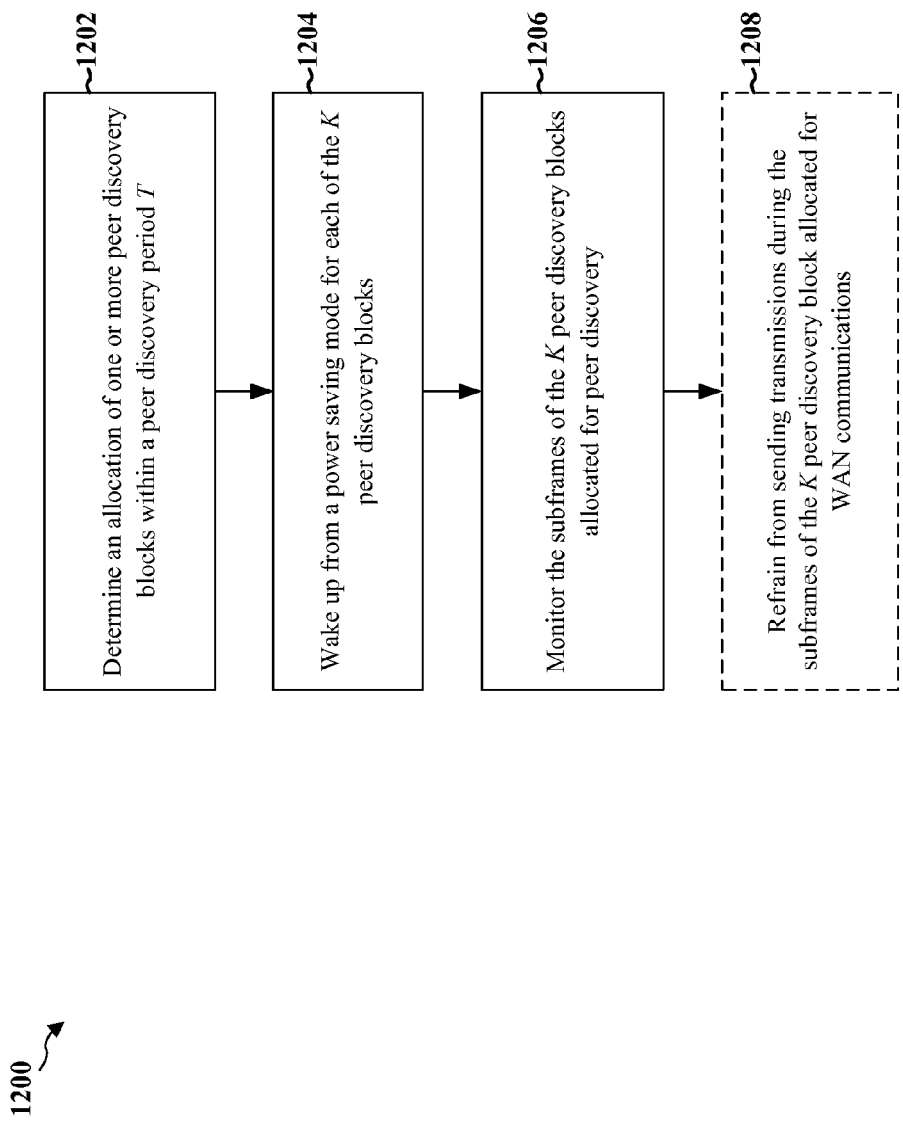
FIG. 12 is a flow chart of a method of wireless communication.

FIG. 12 is a flow chart 1200 of a method of wireless communication. The method may be performed by a UE. At step 1202, the UE may determine an allocation of one or more peer discovery blocks within a peer discovery period T. For example, the UE may determine the discovery period T, a K number of peer discovery blocks assigned in each discovery period T, a k consecutive number of subframes for peer discovery in the K peer discovery blocks, an m consecutive number of subframes for WAN communications in the K peer discovery blocks immediately following the k subframes, and an L number of times that the sequence of k and m subframes is repeated in the peer discovery block. In one configuration, the UE may receive values for T, K, k, n, m, and/or L from an eNB.

At step 1204, the UE may wake up from a power saving mode (e.g., a sleep mode) for each of the K peer discovery blocks. In an aspect, the UE may remain awake for the entirety of each of the K peer discovery blocks, including the subframes of the K peer discovery blocks allocated for WAN communications.

At step 1206, the UE may monitor the subframes of the K peer discovery blocks allocated for peer discovery. In an aspect, the UE may monitor the subframes of the K peer discovery blocks allocated for peer discovery to determine whether another UE is requesting to initiate peer to peer communication with the UE.

At step 1208, the UE may refrain from sending transmissions during the subframes of the peer discovery block allocated for WAN communications.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a base station, comprising:
   determining an integer value K based on at least one of power consumed due to powering UEs on and off, a proportion of delay sensitive WAN traffic, hybrid automatic repeat request (HARQ) transmissions, or a density of UEs of an area;
   allocating, by at least one processor of the base station, the integer value K number of blocks of subframes for WAN and peer-to-peer communications in a peer discovery period and remaining subframes in the peer discovery period for the WAN communications, each block of the K blocks comprising a plurality of subframes;

allocating a first set of subframes of the plurality of subframes for the peer-to-peer communications and a second set of subframes of the plurality of subframes for the WAN communications in each block of the K blocks; and monitoring for uplink transmissions from a UE during one or more subframes of the second set of subframes allocated for the WAN communications in each of the K blocks of subframes.

2. The method of claim 1, wherein allocating the second set of subframes for the WAN communications comprises allocating m×L subframes for the WAN communications in each of the K blocks such that each of at least one set of k contiguous subframes for the peer-to-peer communications is followed by m subframes for the WAN communications, L representing a number of sets of the k contiguous subframes followed by the m subframes in each of the K blocks, m, L, and k being integers.

3. The method of claim 2, wherein the m×L subframes allocated for the WAN communications in each of the K blocks of subframes support at least one of voice services, the HARQ transmissions, or control information transmissions.

4. The method of claim 2, further comprising:
determining an M number of subframes required for the peer-to-peer communications within the peer discovery period;
determining a maximum of D number of subframes to be included in each of the K blocks of subframes, M and D being integers; and
setting values of K, k, m, and L such that M≤(K×k×L) and D≥(k+m)×L.

5. The method of claim 4, wherein T is a period of time of the peer discovery period, wherein an outage probability of WAN traffic is based on a ratio (K×k×L)/T, the method further comprising adjusting the peer discovery period to control the outage probability of the WAN traffic.

6. The method of claim 2, further comprising:
allocating the value K number of blocks of subframes for the WAN and peer-to-peer communications in a second peer discovery period and remaining subframes in the second peer discovery period for the WAN communications; and
allocating a third set of subframes for the peer-to-peer communications and a fourth set of subframes for the WAN communications in each block of the K blocks in the second peer discovery period.

7. The method of claim 6, wherein allocating the fourth set of subframes for the WAN communications in the second peer discovery period comprises allocating m×L subframes for the WAN communications in each of the K blocks in the second peer discovery period such that each of at least one set of n contiguous subframes for the peer-to-peer communications is followed by m subframes for the WAN communications, L representing a number of sets of the n contiguous subframes followed by the m subframes in each of the K blocks, T being a period of time of the second peer discovery period, n being an integer.

8. The method of claim 7, wherein k is equal to n.

9. The method of claim 7, wherein k is not equal to n.

10. The method of claim 2, wherein k is equal to 3, m is equal to 1, and K is equal to 1.

11. The method of claim 7, further comprising receiving values for at least one of T, K, k, n, m, or L from an evolved Node B (eNB).

12. The method of claim 7, further comprising transmitting values for at least one of T, K, k, n, m, or L in a System Information Block (SIB) to one or more UEs.

13. The method of claim 1, wherein the second set of subframes for the WAN communications in each block of the K blocks are for receiving uplink communications transmitted by a UE.

14. A base station for wireless communication, comprising:
means for determining an integer value K based on at least one of power consumed due to powering UEs on and off, a proportion of delay sensitive traffic, hybrid automatic repeat request (HARQ) transmissions, or a density of UEs of an area;
means for allocating the integer value K number of blocks of subframes for WAN and peer-to-peer communications in a peer discovery period and remaining subframes in the peer discovery period for the WAN communications, each block of the K blocks comprising a plurality of subframes;
means for allocating a first set of subframes of the plurality of subframes for the peer-to-peer communications and a second set of subframes of the plurality of subframes for the WAN communications in each block of the K blocks; and
means for monitoring for uplink transmissions from a UE during one or more subframes of the second set of subframes allocated for the WAN communications in each of the K blocks of subframes.

15. The base station of claim 14, wherein the means for allocating the second set of subframes for the WAN communications is configured to allocate m×L subframes for the WAN communications in each of the K blocks such that each of at least one set of k contiguous subframes for the peer-to-peer communications is followed by m subframes for the WAN communications, L representing a number of sets of the k contiguous subframes followed by the m subframes in each of the K blocks, m, L, and k being integers.

16. The base station of claim 15, wherein the m×L subframes allocated for the WAN communications in each of the K blocks of subframes support at least one of voice services, the HARQ transmissions, or control information transmissions.

17. The base station of claim 15, further comprising:
means for determining an M number of subframes required for the peer-to-peer communications within the peer discovery period;
means for determining a maximum of D number of subframes to be included in each of the K blocks of subframes, M and D being integers; and
means for setting values of K, k, m, and L such that M≤(K×k×L) and D≥(k+m)×L.

18. The base station of claim 17, wherein T is a period of time of the peer discovery period, wherein an outage probability of WAN traffic is based on a ratio (K×k×L)/T, the base station further comprising means for adjusting the peer discovery period to control the outage probability of the WAN traffic.

19. The base station of claim 15, further comprising:
means for allocating the value K number of blocks of subframes for the WAN and peer-to-peer communications in a second peer discovery period and remaining subframes in the second peer discovery period for the WAN communications; and
means for allocating a third set of subframes for the peer-to-peer communications and a fourth set of subframes for the WAN communications in each block of the K blocks in the second peer discovery period.

20. The base station of claim 19, wherein the means for allocating the fourth set of subframes for the WAN communications in the second peer discovery period is configured to allocate m×L subframes for the WAN communications in each of the K blocks in the second peer discovery period such that each of at least one set of n contiguous subframes for the peer-to-peer communications is followed by m subframes for the WAN communications, L representing a number of sets of the n contiguous subframes followed by the m subframes in each of the K blocks, T being a period of time of the second peer discovery period, n being an integer.

21. The base station of claim 20, wherein k is equal to n.

22. The base station of claim 20, wherein k is not equal to n.

23. The base station of claim 15, wherein k is equal to 3, m is equal to 1, and K is equal to 1.

24. The base station of claim 20, further comprising means for receiving values for at least one of T, K, k, n, m, or L from an evolved Node B (eNB).

25. The base station of claim 20, further comprising means for transmitting values for at least one of T, K, k, n, m, or L in a System Information Block (SIB) to one or more UEs.

26. The base station of claim 14, wherein the second set of subframes for the WAN communications in each block of the K blocks are for receiving uplink communications transmitted by a UE.

27. A base station for wireless communication, comprising:
a determining module configured to determine an integer value K based on at least one of power consumed due to powering UEs on and off, a proportion of delay sensitive traffic, hybrid automatic repeat request (HARQ) transmissions, or a density of UEs of an area;
an allocating module configured to:
allocate the integer value K number of blocks of subframes for WAN and peer-to-peer communications in a peer discovery period and remaining subframes in the peer discovery period for the WAN communications, each block of the K blocks comprising a plurality of subframes; and
allocate a first set of subframes of the plurality of subframes for the peer-to-peer communications and a second set of subframes of the plurality of subframes for the WAN communications in each block of the K blocks; and
a monitoring module configured to monitor for uplink transmissions from a UE during one or more subframes of the second set of subframes allocated for the WAN communications in each of the K blocks of subframes.

28. The base station of claim 27, wherein m×L subframes are allocated for the WAN communications in each of the K blocks such that each of at least one set of k contiguous subframes for the peer-to-peer communications is followed by m subframes for the WAN communications, L representing a number of sets of the k contiguous subframes followed by the m subframes in each of the K blocks, m, L, and k being integers.

29. The base station of claim 28, wherein the m×L subframes allocated for the WAN communications in each of the K blocks of subframes support at least one of voice services, the HARQ transmissions, or control information transmissions.

30. The base station of claim 28, wherein the determining module is further configured to:
determine an M number of subframes required for the peer-to-peer communications within the peer discovery period; and
determine a maximum of D number of subframes to be included in each of the K blocks of subframes, M and D being integers; and
a setting module configured to set values of K, k, m, and L such that M≤(K×k×L) and D≥(k+m)×L.

31. The base station of claim 30, wherein T is a period of time of the peer discovery period, wherein an outage probability of WAN traffic is based on a ratio (K×k×L)/T, the base station further comprising an adjusting module configured to adjust the peer discovery period to control the outage probability of the WAN traffic.

32. The base station of claim 28, wherein the allocating module is further configured to:
allocate the value K number of blocks of subframes for the WAN and peer-to-peer communications in a second peer discovery period and remaining subframes in the second peer discovery period for the WAN communications; and
allocate a third set of subframes for the peer-to-peer communications and a fourth set of subframes for the WAN communications in each block of the K blocks in the second peer discovery period.

33. The base station of claim 32, wherein, to allocate the fourth set of subframes for the WAN communications in the second peer discovery period, the allocating module is further configured to allocate m×L subframes for the WAN communications in each of the K blocks in the second peer discovery period such that each of at least one set of n contiguous subframes for the peer-to-peer communications is followed by m subframes for the WAN communications, L representing a number of sets of the n contiguous subframes followed by the m subframes in each of the K blocks, T being a period of time of the second peer discovery period, n being an integer.

34. The base station of claim 33, wherein k is equal to n.

35. The base station of claim 33, wherein k is not equal to n.

36. The base station of claim 28, wherein k is equal to 3, m is equal to 1, and K is equal to 1.

37. The base station of claim 33, further comprising a receiving module configured to receive values for at least one of T, K, k, n, m, or L from an evolved Node B (eNB).

38. The base station of claim 33, further comprising a transmission module configured to transmit values for at least one of T, K, k, n, m, or L in a System Information Block (SIB) to one or more UEs.

39. The base station of claim 27, wherein the second set of subframes for the WAN communications in each block of the K blocks are for receiving uplink communications transmitted by a UE.

40. A non-transitory computer-readable medium storing computer executable code for executing on at least one processor of a base station, comprising code for:
determining an integer value K based on at least one of power consumed due to powering UEs on and off, a proportion of delay sensitive traffic, hybrid automatic repeat request (HARQ) transmissions, or a density of UEs of an area;
allocating the integer value K number of blocks of subframes for WAN and peer-to-peer communications in a peer discovery period and remaining subframes in the peer discovery period for the WAN communications, each block of the K blocks comprising a plurality of subframes;

allocating a first set of subframes of the plurality of subframes for the peer-to-peer communications and a second set of subframes of the plurality of subframes for the WAN communications in each block of the K blocks; and monitoring for uplink transmissions from a UE during one or more subframes of the second set of subframes allocated for the WAN communications in each of the K blocks of subframes.

41. The non-transitory computer-readable medium of claim 40, wherein the code for allocating the second set of subframes for the WAN communications is configured to allocate m×L subframes for the WAN communications in each of the K blocks such that each of at least one set of k contiguous subframes for the peer-to-peer communications is followed by m subframes for the WAN communications, L representing a number of sets of the k contiguous subframes followed by the m subframes in each of the K blocks, m, L, and k being integers.

42. The non-transitory computer-readable medium of claim 41, wherein the m×L subframes allocated for the WAN communications in each of the K blocks of subframes support at least one of voice services, the HARQ transmissions, or control information transmissions.

43. The non-transitory computer-readable medium of claim 41, further comprising code for:
determining an M number of subframes required for the peer-to-peer communications within the peer discovery period;
determining a maximum of D number of subframes to be included in each of the K blocks of subframes, M and D being integers; and
setting values of K, k, m, and L such that M≤(K×k×L) and D≥(k+m)×L.

44. The non-transitory computer-readable medium of claim 43, wherein T is a period of time of the peer discovery period, wherein an outage probability of WAN traffic is based on a ratio (K×k×L)/T, the computer-readable medium further comprising code for adjusting the peer discovery period to control the outage probability of the WAN traffic.

45. The non-transitory computer-readable medium of claim 41, further comprising code for:
allocating the value K number of blocks of subframes for the WAN and peer-to-peer communications in a second peer discovery period and remaining subframes in the second peer discovery period for the WAN communications; and
allocating a third set of subframes for the peer-to-peer communications and a fourth set of subframes for the WAN communications in each block of the K blocks in the second peer discovery period.

46. The non-transitory computer-readable medium of claim 45, wherein the code for allocating the fourth set of subframes for the WAN communications in the second peer discovery period is configured to allocate m×L subframes for the WAN communications in each of the K blocks in the second peer discovery period such that each of at least one set of n contiguous subframes for the peer-to-peer communications is followed by m subframes for the WAN communications, L representing a number of sets of the n contiguous subframes followed by the m subframes in each of the K blocks, T being a period of time of the second peer discovery period, n being an integer.

47. The non-transitory computer-readable medium of claim 46, wherein k is equal to n.

48. The non-transitory computer-readable medium of claim 46, wherein k is not equal to n.

49. The non-transitory computer-readable medium of claim 41, wherein k is equal to 3, m is equal to 1, and K is equal to 1.

50. The non-transitory computer-readable medium of claim 46, further comprising code for receiving values for at least one of T, K, k, n, m, or L from an evolved Node B (eNB).

51. The non-transitory computer-readable medium of claim 46, further comprising code for transmitting values for at least one of T, K, k, n, m, or L in a System Information Block (SIB) to one or more UEs.

52. The non-transitory computer-readable medium of claim 40, wherein the second set of subframes for the WAN communications in each block of the K blocks are for receiving uplink communications transmitted by a UE.

* * * * *